May 19, 1931.                M. TRECHSEL                1,806,319
            DOUBLE ACTING INTERNAL COMBUSTION ENGINE
                       Filed May 22, 1928
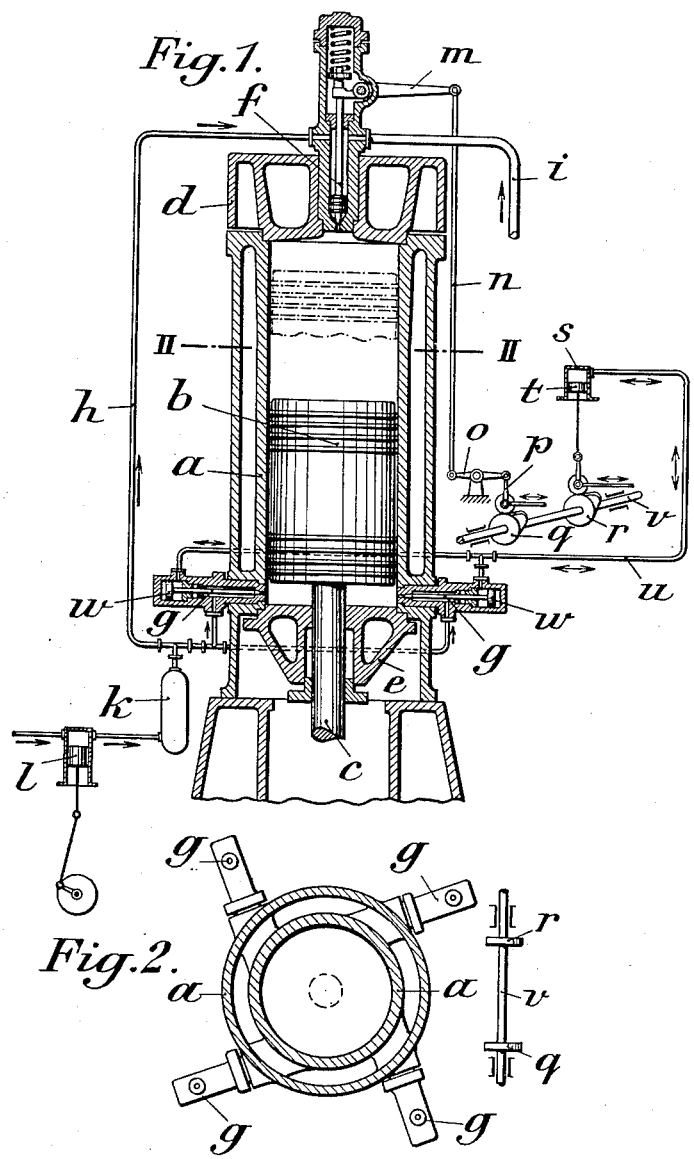

Patented May 19, 1931

1,806,319

UNITED STATES PATENT OFFICE

MAX TRECHSEL, OF WINTERTHUR, SWITZERLAND, ASSIGNOR TO THE FIRM SULZER FRÈRES SOCIÉTÉ ANONYME, OF WINTERTHUR, SWITZERLAND

DOUBLE ACTING INTERNAL COMBUSTION ENGINE

Application filed May 22, 1928, Serial No. 279,693, and in Switzerland June 24, 1927.

This invention relates to double acting internal combustion engines of the fuel injection type and has for its object to provide an engine which will be more efficient in operation than those hitherto proposed.

According to this invention fuel is injected with air into the upper end of the cylinder but fuel is injected without air into the lower end of the cylinder, adjacent to the crank. Thus whilst maintaining the advantages of air injection for the upper combustion chamber, cooling of the lower combustion chamber, which is unavoidable with air injection, is prevented and as a result the lower combustion chamber can be of larger dimensions without the usual drawbacks.

One construction according to this invention is illustrated somewhat diagrammatically by way of example in the accompanying drawings, in which Figure 1 is a longitudinal section and
Figure 2 a section on line II—II of Figure 1.

A double acting internal combustion engine has a cylinder $a$ containing a piston $b$ with piston rod $c$, the upper end of the cylinder being provided with a head or cover $d$ and the lower end with a cover $e$. The fuel is injected into the upper and lower combustion chambers, the injection devices being controlled by a cam shaft diagrammatically shown at $v$.

The cylinder head is provided in the usual manner with a centrally arranged fuel injection device $f$ through which fuel from the pipe $h$ is introduced, with the addition of highly compressed air from the pipe $i$, axially into the disc-like upper combustion chamber and at the lower end of the cylinder four fuel injection devices $g$ are provided through which fuel is injected tangentially without the addition of air into the lower combustion chamber.

The fuel is delivered to the upper and lower injection devices $f$ and $g$ from a common accumulator $k$ supplied in the usual way by means of a pump $l$.

The upper fuel injection device is mechanically operated by the lever $m$, link $n$, rocker $o$ and rod $p$ actuated by the cam $q$ in the usual manner. The lower fuel injection devices $g$ on the other hand occupy different positions with relation to the cam shaft and must all be simultaneously operated and are therefore provided with a hydraulic control gear. This comprises a single cam $r$ actuating a piston $t$ in a cylinder $s$ from which control liquid is periodically delivered to a control piston $w$ connected to the injection devices $g$ by the pipe $u$.

By the use of these two different types of fuel injection devices, it is possible to retain the advantages of air injection for the upper disc-like combustion chamber while avoiding cooling of the lower annular combustion chamber into which the fuel is injected without the use of air. As a result, the compression pressure in the lower chamber can be reduced and thus the dimensions of this chamber can be increased, enabling the airless fuel injection devices to be better distributed around the larger circumference of the lower chamber.

Moreover, airless fuel injection devices are smaller than those using compressed air so that the openings in the cylinder wall can be of reduced diameter, which produces smaller stresses at the edges of these openings and enables a larger number of injection devices to be provided, resulting in a better distribution of fuel to the lower annular combustion chamber.

I claim:

1. In a double acting internal combustion engine of the fuel injection type, the combination with a device for injecting fuel with air to the upper combustion chamber of means for injecting fuel without air into the lower end of the cylinder adjacent to the crank.

2. In a double acting internal combustion engine of the fuel injection type, the combination with a device for injecting fuel with air to the upper combustion chamber of means for injecting fuel without air into the lower end of the cylinder adjacent to the crank, the lower combustion chamber being of increased size with respect to the upper combustion chamber.

3. In a double acting internal combustion engine of the fuel injection type, the combination with a device for injecting fuel with air to the upper combustion chamber of means for injecting fuel without air into the lower end of the cylinder adjacent to the crank, the airless injection devices being distributed around the circumference of the lower combustion chamber.

In testimony whereof I have affixed my signature.

MAX TRECHSEL.